United States Patent
Tomioka et al.

(10) Patent No.: US 9,174,343 B2
(45) Date of Patent: Nov. 3, 2015

(54) PICKING SYSTEM AND PICKING METHOD (75) Inventors: Satoshi Tomioka, Inuyama (JP); Masato Ishida, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 816 days.

(21) Appl. No.: 13/060,446

(22) PCT Filed: Jun. 19, 2009

(86) PCT No.: PCT/JP2009/002791
§ 371 (c)(1),
(2), (4) Date: Feb. 24, 2011

(87) PCT Pub. No.: WO2010/023795
PCT Pub. Date: Mar. 4, 2010

(65) Prior Publication Data
US 2011/0153065 A1    Jun. 23, 2011

(30) Foreign Application Priority Data
Aug. 27, 2008 (JP) .................................. 2008-218646

(51) Int. Cl.
*G06F 17/00* (2006.01)
*B25J 9/16* (2006.01)

(52) U.S. Cl.
CPC ..... *B25J 9/1687* (2013.01); *G05B 2219/31432* (2013.01); *G05B 2219/40014* (2013.01); *G05B 2219/49302* (2013.01)

(58) Field of Classification Search
USPC ................. 700/246, 245, 247, 226; 198/349, 198/349.5, 246
See application file for complete search history.

(56) References Cited

U.S. PATENT DOCUMENTS 4,351,663 A * 9/1982 Wood ................................ 65/66
4,733,360 A * 3/1988 Kobayashi et al. ............. 702/40

(Continued)

FOREIGN PATENT DOCUMENTS

EP          1764729 A1 *  3/2007
JP     2000-233833 A      8/2000

(Continued)

OTHER PUBLICATIONS

NB9001133, IBM Technical Disclosure Bulletin, Jan. 1990, U.S., vol. 32, Issue No. 8B, Page Nos. 133-137.*
IBM Technical Disclosure, vol. 32, Issue 8B, Jan. 1990, pp. 133-137.*
Official Communication issued in International Patent Application No. PCT/JP2009/002791, mailed on Aug. 25, 2009.
English translation of Official Communication issued in corresponding International Application PCT/JP2009/002791, mailed on Apr. 14, 2011.

*Primary Examiner* — Gene Crawford
*Assistant Examiner* — Lester Rushin
(74) *Attorney, Agent, or Firm* — Keating & Bennett, LLP (57) ABSTRACT

A picking system enables a user to easily know when an article that has been placed is different from an article originally scheduled to be placed in a particular position. The picking system includes a picking robot, an ID reader, an encoder, a comparing unit, and a terminal screen. The picking robot picks a workpiece from a first predetermined position and places the article in a second predetermined position. The ID reader acquires identification information of the workpiece picked by the picking robot. The comparing unit compares the identification information acquired by the ID reader with identification information of a workpiece scheduled to be picked. The terminal screen indicates, based on a result of the comparison executed by the comparing unit, a placement position of a workpiece whose identification information does not match the identification information of the workpiece scheduled to be picked.

7 Claims, 6 Drawing Sheets

(56) References Cited

U.S. PATENT DOCUMENTS

| | | | |
|---|---|---|---|
| 8,335,585 B2 * | 12/2012 | Hansl et al. | 700/230 |
| 2003/0077151 A1 * | 4/2003 | Makita | 414/222.01 |
| 2008/0118335 A1 | 5/2008 | Ishida et al. | |
| 2008/0177417 A1 * | 7/2008 | Kasuga et al. | 700/213 |
| 2009/0066513 A1 * | 3/2009 | Kondo et al. | 340/572.1 |

FOREIGN PATENT DOCUMENTS

| | | | |
|---|---|---|---|
| JP | 2002-128230 A | 5/2002 | |
| JP | 2004-352436 A | 12/2004 | |
| JP | 2008-169019 A * | 7/2008 | B65G 57/00 |
| WO | 2006/059676 A1 | 6/2006 | |

* cited by examiner

| Identification information | Part number | Maker code | Optional |
|---|---|---|---|
| ⋮ | ⋮ | ⋮ | ⋮ |
| 000010 | A01 | 111 | ◆◆◆ |
| 000011 | B02 | 101 | ○○○ |
| ⋮ | ⋮ | ⋮ | ⋮ |

PICKING SYSTEM AND PICKING METHOD

BACKGROUND OF THE INVENTION

1. Field of the Invention

The present invention relates to a picking system and a picking method used for managing articles in a physical distribution route.

2. Description of the Related Art

In an article delivery system, labels having barcodes printed on them, for example, are attached to articles. A computer manages various delivery conditions of articles based on identification information read from the barcodes.

For example, WO2006/059676 discloses an automated warehouse equipped with a picking system arranged to manage articles having an IC tag attached. The picking system has a picking robot arranged to extract articles from a carrier or the like one at a time and place them in a predetermined position. A hand of the picking robot is installed with an ID reader for reading data from an IC tag attached to an article. Each time the hand places an article, the ID reader reads the ID of the article. As a result, a computer can accurately recognize the IDs and positional relationships of the articles placed by the hand.

A problem occurring with a conventional picking system will now be explained. After the articles are placed, the computer can accurately manage the articles based on the positions and ID information. However, if an article other than a scheduled article is placed in a particular position, the computer will not recognize that an incorrect article is in that position. Consequently, a user cannot easily learn about the incorrect article placement.

SUMMARY OF THE INVENTION

Preferred embodiments of the present invention solve the aforementioned problems by providing a picking system and a picking method that enable a user to easily learn about an incorrect article placement when an article other than a scheduled article has been placed in a particular position.

According to a preferred embodiment of the present invention, a picking system arranged to pick articles having identification information attached thereto includes a picking unit, an ID reader, a position identifying unit, a comparing unit, and an indicator unit. The picking unit is arranged to take an article from a first predetermined position and place the article in a second predetermined position other than the first predetermined position. The ID reader is arranged to acquire identification information of an article picked by the picking unit. The comparing unit is arranged to compare identification information acquired by the ID reader to identification information of an article scheduled to be picked. The indicator unit is arranged to, based on a result of the comparison executed by the comparing unit and the placement position identified by the position identifying unit, indicate a placement position of a placed article whose identification information does not match the identification information of the article scheduled to be picked. Regardless of whether or not the identification information of the picked article matches the identification information of the article scheduled to be picked, the picking unit picks the article from the first predetermined position and places the picked article in the second predetermined position other than the first predetermined position. This picking system compares the identification information of an article actually picked to the identification information of an article scheduled to be picked and indicates a result of the comparison as well as a placement position. As a result, a user can easily learn that an article other than a scheduled article has been placed in a particular position, i.e., that an incorrect placement has occurred. Additionally, since the comparison result and the placement position are indicated on the indicator unit, a user can easily learn the position of an article that has been incorrectly placed.

In a picking system according to a preferred embodiment of the present invention, the picking unit is preferably arranged such that, if the result of the comparison executed by the comparing unit indicates that identification information of an article that has been picked does not match the identification information of the article scheduled to be picked, the article that has been picked is placed in a third predetermined position different from the above-described first and second predetermined positions. As a result, the article whose identification information does not match can be removed in advance.

In a picking system according to a preferred embodiment of the present invention, regardless of whether or not the identification information of the picked article matches the identification information of the article scheduled to be picked, the picking unit picks the article from the first predetermined position and places the article in a second predetermined position other than the first predetermined position. The position identifying unit identifies the placement position of the article placed in the second predetermined position other than the first predetermined position.

The indicator unit indicates the placement position of the placed article in the second predetermined position other than the first predetermined position whose identification information does not match the identification information of the article scheduled to be picked.

In a picking system according to a preferred embodiment of the present invention, based on the result of the comparison executed by the comparing unit, the picking unit places an article whose identification information does not match the identification information of the article scheduled to be picked in a position within a second predetermined position other than the first predetermined position where a user can remove the article easily. As a result, the article whose identification information does not match can be removed easily.

In a picking system according to a preferred embodiment of the present invention, the indicator unit is preferably arranged to indicate a plurality of information items related to an article whose identification information does not match the identification information of the article scheduled to be picked. As a result, a worker can easily learn details about the abnormality that are not easy to discern based on external appearance, such a difference of robot numbers or an abnormal consumption expiration date.

A picking method according to another preferred embodiment of the present invention is a method of picking articles having identification information attached thereto and includes picking an article from a first predetermined position and placing the article in a second predetermined position other than the first predetermined position; reading identification information of the article picked in the picking step; identifying a placement position of the article placed in the picking step; comparing the identification information acquired in the ID reading step with identification information of an article scheduled to be picked; and indicating, based on a result of the comparing step and the placement position identified in the placement position identifying step, a placement position for the placed article whose identification information does not match the identification information of the article scheduled to be picked. In the picking step, regardless of whether or not the identification information of the picked article matches the identification information of the article scheduled to be picked, the article is picked from the first predetermined position and placed in the second predetermined position other than the first predetermined position.

This picking method compares the identification information of an article actually picked to the identification information of an article scheduled to be picked and indicates a result of the comparison and a placement position. As a result, a user can easily learn that an article other than a scheduled article has been placed in a particular position, i.e., that an incorrect placement has occurred. Additionally, since the comparison result and the placement position are indicated, a user can easily learn the position of an article that has been incorrectly placed.

With a picking system and a picking method according to a preferred embodiment of the present invention, a user can easily learn that an incorrect placement has occurred when an article other than a scheduled article has been placed in a particular position.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A picking system 1 according to a preferred embodiment of the present invention will now be explained with reference to FIGS. 1 to 4.

(1) Overview of Constituent Features of Picking System 1

Figure 1:
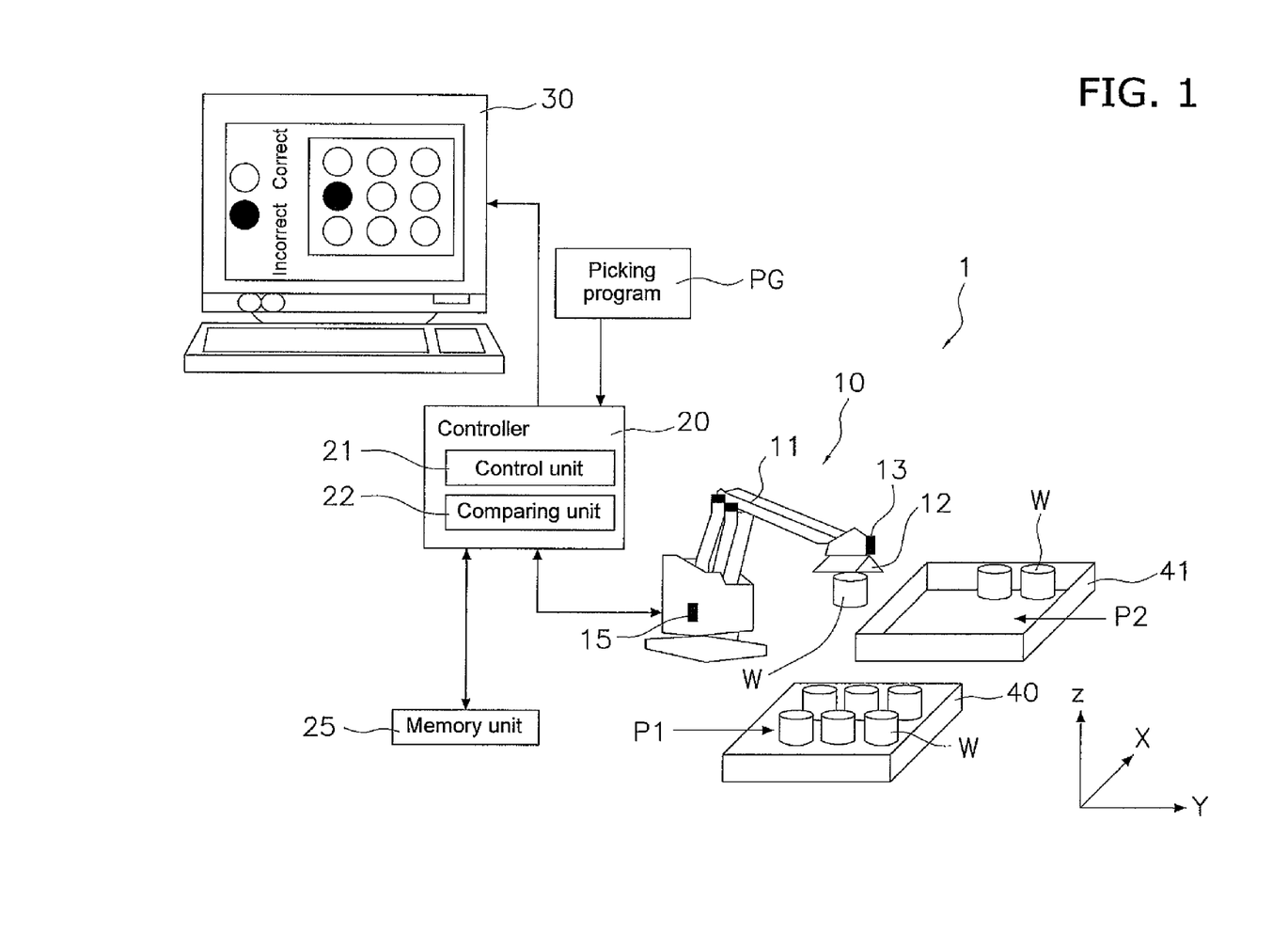
FIG. 1 illustrates a configuration of a picking system according to a preferred embodiment of the present invention.

The picking system 1 is arranged to pick workpieces (articles) W preferably one at a time from a workpiece picking box 40 (e.g., a bucket or other container) containing multiple workpieces W and place the workpieces W into a workpiece placing box 41. As shown in FIG. 1, the picking system 1 is equipped with a picking robot 10, an encoder (position identifying unit) 15, a controller 20, a memory unit 25, and a terminal screen (indicator unit) 30. An RFID (radial frequency identification) tag is attached to each of the workpieces W.

As shown in FIG. 1, the picking robot 10 preferably includes an arm 11, a hand 12, and an ID reader 13.

The arm 11 is arranged to be movable in a vertical direction and a horizontal direction (X, Y, and Z directions) by an air cylinder or other drive mechanisms and is controlled by the controller 20 to be described later.

The hand 12 is arranged on a tip end of the arm 11 and is arranged to hold a workpiece W through suction, a chucking part, or the like.

When a workpiece W is held by the hand 12, the ID reader 13 reads the RFID tag attached to the workpiece W and acquires identification information of the workpiece W. The ID reader 13 is arranged such that it comes close to the RFID tag attached to a workpiece W when the workpiece W is held by the hand 12. The ID reader 13 sends the acquired identification information of the workpiece W to a comparing unit 22 (explained later).

The encoder 15 is arranged to acquire a position of the hand 12 of the picking robot 10. More specifically, the encoder 15 is attached to a drive unit and measures a position of a workpiece W placed by the hand 12. As a result, the controller 20 can acquire placement positions of workpieces W in the workpiece placing box 41.

The controller 20 controls the entire picking system 1. Control of the picking operation of the picking robot 10 will now be explained.

The controller 20 executes a picking program PG to control the picking robot 10. More specifically, for example, the controller 20 reads the picking program PG from a ROM (not shown), loads it into a RAM (not shown), and defines functional blocks including a control unit 21 and a comparing unit 22 as shown in FIG. 1. The functional blocks are in such a state that they can be executed by a CPU (not shown) provided in the controller 20.

The control unit 21 is arranged to control operations such as moving the arm 11 of the picking robot 10 and holding a workpiece W in accordance with control commands entered in advance by a user. As a result, a prescribed workpiece W can be picked. In this preferred embodiment, a control command includes instructions to pick up a workpiece W arranged in a first predetermined position P1 in the workpiece picking box 40 and place the workpiece W into a second predetermined position P2 in the workpiece placing box 41. The control command also includes identification information regarding the workpiece W targeted to be picked.

The comparing unit 22 compares the identification information of a workpiece W acquired by the ID reader 13 with the identification information of a workpiece W scheduled to be picked, i.e., the workpiece identification information included in the control command. In other words, when a workpiece W is picked in response to a control command, the comparing unit 22 compares the identification information of the workpiece W that was picked with the identification information of the workpiece W targeted for picking in the control command.

Figure 2:
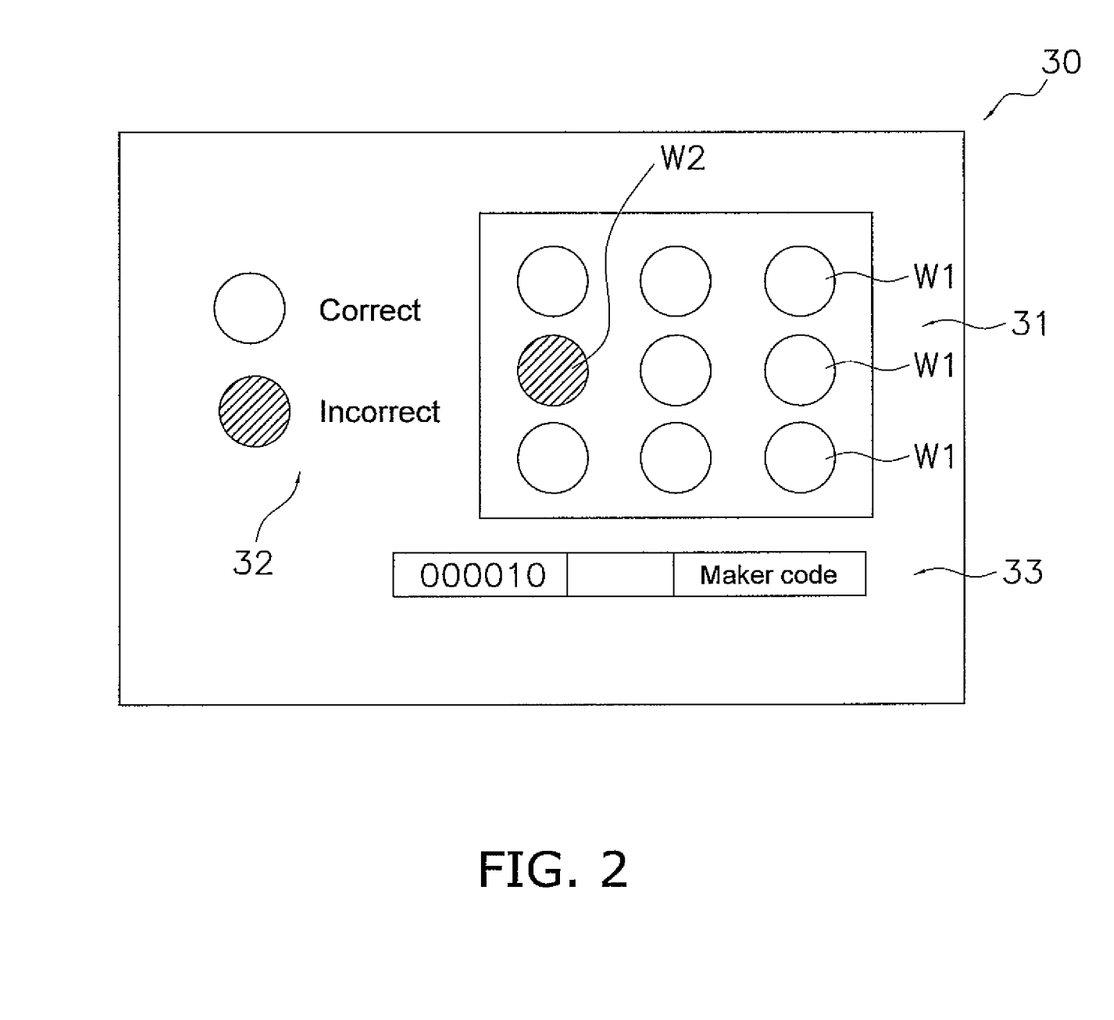
FIG. 2 illustrates content displayed on the terminal screen shown in FIG. 1.

A result of the comparison executed by the comparing unit 22 is shown on the terminal screen 30. Specifically, the terminal screen 30 displays a position indicating unit 31 that indicates the placement position of a workpiece W whose identification information does not match a targeted workpiece W, a legend indicating unit 32 showing an legend explaining how the position indicating unit 31 is to be interpreted, and an attribute information indicating unit 33 indicating attribute information of a specific workpiece W (explained later). As shown in FIG. 2, the position indicating unit 31 shows a plan view of all the workpieces W placed in the workpiece placing box 41 and indicates the workpieces W in accordance with the legend such that workpieces W1 whose identification information matches the identification information in the control command can be distinguished from workpieces W2 whose identification information does not match the identification information in the control command.

More specifically, a workpiece W1 whose identification information matches that in the control command is indicated with a white circle (○) and a workpiece W2 whose identification information does not match that in the control command is indicated with a black (hatched) circle (●). The legend indicating unit 32 explains the meanings of the white circles (○) and black circles (●) in the position indicating unit 31. In this preferred embodiment, a white circle (○) indicating a workpiece W1 whose identification information matches that in the control command is explained as "Correct" and a black circle (●) indicating a workpiece W2 whose identification information does not match that in the control command is explained as "Incorrect." For a workpiece W2 whose identification information does not match that in the control command, the attribute information indicating unit 33 indicates the actual differing items within the attribute information of the workpiece W2.

Figure 4:
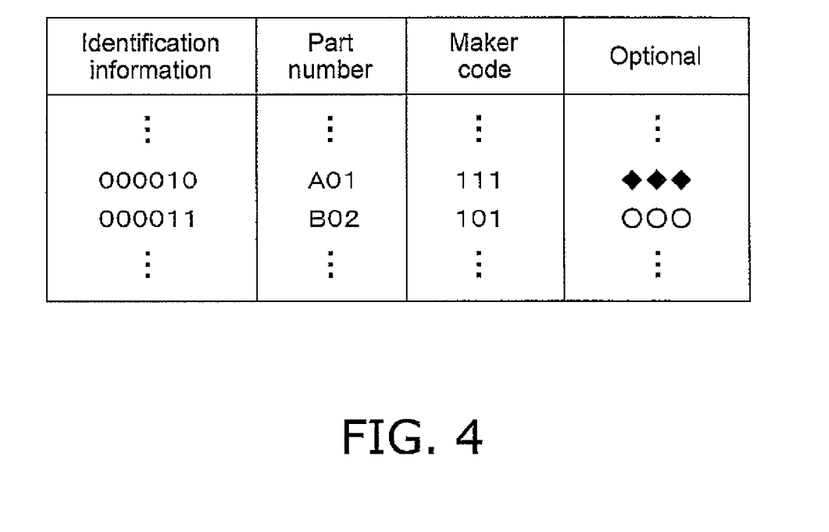
FIG. 4 illustrates content of a database stored in the memory unit shown in FIG. 1.

The memory unit 25 stores a database DB of the attribute information of the workpieces W. The database DB stored in the memory unit 25 includes identification information, maker codes, part numbers, and optional items, for example. The optional items may preferably include information such as, for example, expiration dates, next addressees, next destinations, next processes, identification information for a final product into which the workpiece W will be incorporated, wholesale prices, etc. The picking system 1 can acquire attribute information for a workpiece W that has been picked by matching the identification information acquired by the ID reader 13 with the identification information stored in the database DB.

(2) Operation of Picking System 1

Figure 3:
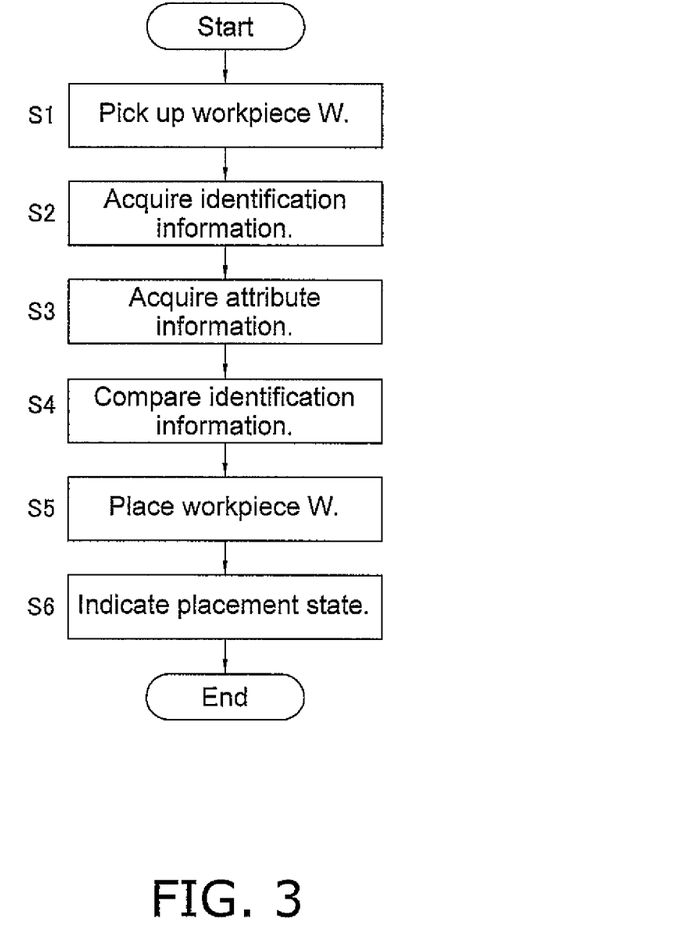
FIG. 3 is a flowchart illustrating operation of a picking system according to a preferred embodiment of the present invention.

The operation of the picking system 1 will now be explained with reference to FIGS. 3 and 4.

In step S1, the picking robot 10 picks up a workpiece W arranged in a first predetermined position P1 in the workpiece picking box 40 in accordance with a control command transmitted from the controller 20. More specifically, the arm 11 of the picking robot 10 moves to a position above the first predetermined position P1. The hand 12 is then lowered vertically (in the Z direction) and controlled to adhere to the workpiece W through suction. The control command described here is arranged to pick up a workpiece W located in a first predetermined position P1 in the workpiece picking box 40 and move it into a second predetermined position P2 located in the workpiece placing box 41.

In step S2, the ID reader 13 acquires identification information from a RFID tag attached to the workpiece W. More specifically, the ID reader 13 wirelessly establishes a remote communication with the RFID tag using an electromagnetic field or a radio signal so as to acquire the identification information. The picking system 1 according to this preferred embodiment is arranged such that it can acquire the identification information at a time when the hand 12 adheres onto the workpiece W through suction.

In step S3, the picking system 1 acquires the attribute information of the workpiece W held by the hand 12. More specifically, the controller 20 uses the identification information acquired by the ID reader 13 as a key to search the database DB stored in the memory unit 25 and extracts the attribute information stored in the database DB that matches the identification information acquired by the ID reader 13. As a result, the attribute information of the picked workpiece W can be acquired.

In step S4, the comparing unit 22 compares the identification information included in the control command issued in step S1 with the identification information acquired by the ID reader 13 in step S2. In this way, if the two sets of identification information do not match, the system determines that the workpiece W that should be moved is not the workpiece currently held.

In step S5, the picking robot 10 places the workpiece W held by the hand 12 through suction in step S1 at the second predetermined position P2 in the workpiece placing box 41 in accordance with the control command transmitted from the controller 20. More specifically, the arm 11 of the picking robot 10 is moved to a position above the second predetermined position P2. The hand 12 holding the workpiece W is then moved vertically downward and the workpiece W is placed in the workpiece placing box 41.

In step S6, the picking system 1 indicates, on the terminal screen 30, the placement position of the workpiece W whose identification information does not match that in the control command. More specifically, as shown in FIG. 2, for example, all of the workpieces W arranged in the workpiece placing box 41 are shown in a plan view and depicted in such a way that workpieces W whose identification information matches that in the control command and workpieces W whose identification information does not match that in the control command can be distinguished from one another. In this way, a user can immediately ascertain the placement position of a workpiece W whose identification information is incorrect, i.e. the placement position of the workpiece W that is different from a workpiece W that was originally scheduled to be placed in that position. As shown in FIG. 2, the picking system 1 also indicates which items within the attribute information differ from that of the scheduled workpiece W whose identification information does not match that in the control command. More specifically, the system compares the attribute information corresponding to the identification information acquired by the ID reader 13 to the attribute information corresponding to the identification information included in the control command and indicates the differing attribute information items between the two. In this way, incorrect information that is difficult to recognize based on external appearance, e.g. an incorrect consumption expiration date, can be recognized immediately.

(3) Other Preferred Embodiments

A preferred embodiment of the present invention has been explained heretofore, but the present invention is not limited to the preferred embodiment. Various changes can be made without departing from the scope of the present invention.

The previously explained preferred embodiment presents an example in which the picking system 1 is preferably arranged such that the picking robot 10 places a workpiece W at a second predetermined position P2 in the workpiece placing box 41 in accordance with a control command. However, the present invention is not limited to such a placement.

For example, when the comparing unit 22 determines that a set of identification information does not match in step S4, it is acceptable for the picking robot 10 to place the workpiece in a third predetermined position P3 instead of placing the workpiece in the second predetermined position P2 specified in the control command.

Figure 5:
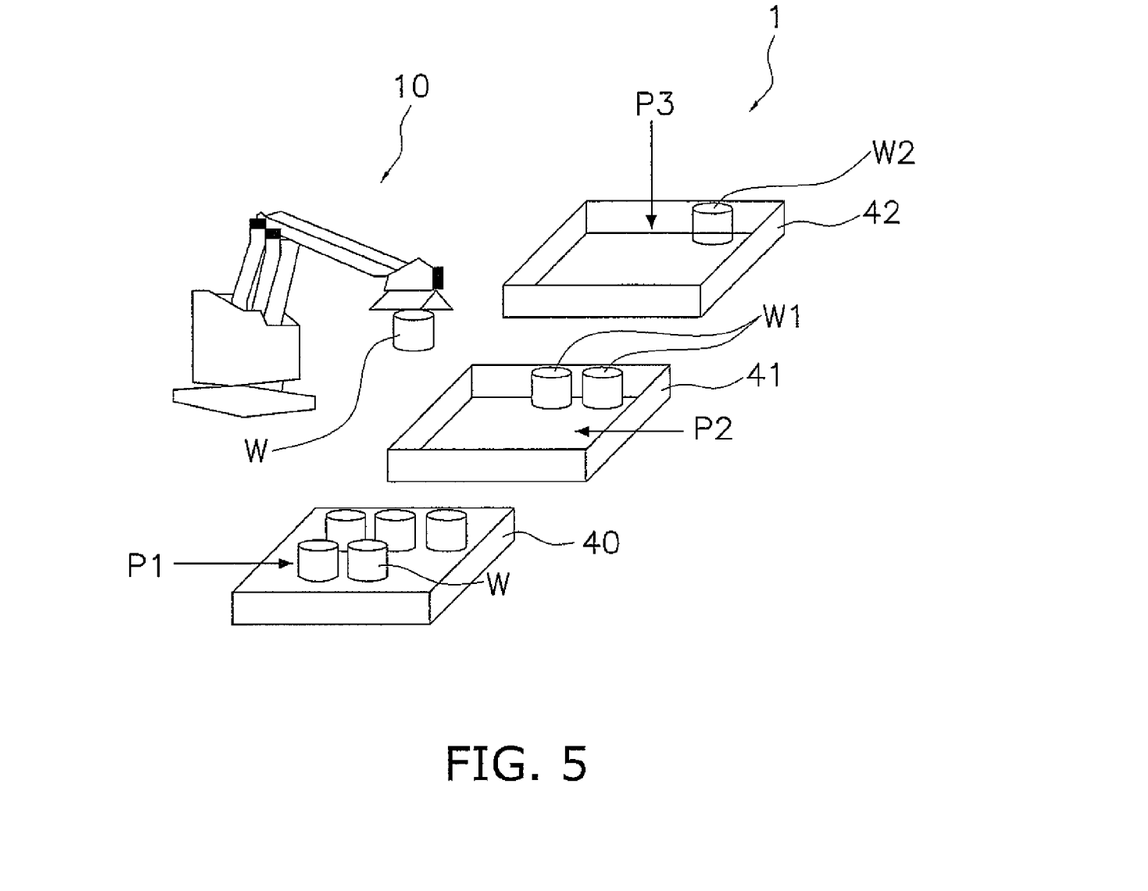
FIG. 5 illustrates a configuration of a picking system according to another preferred embodiment of the present invention.
Figure 6:
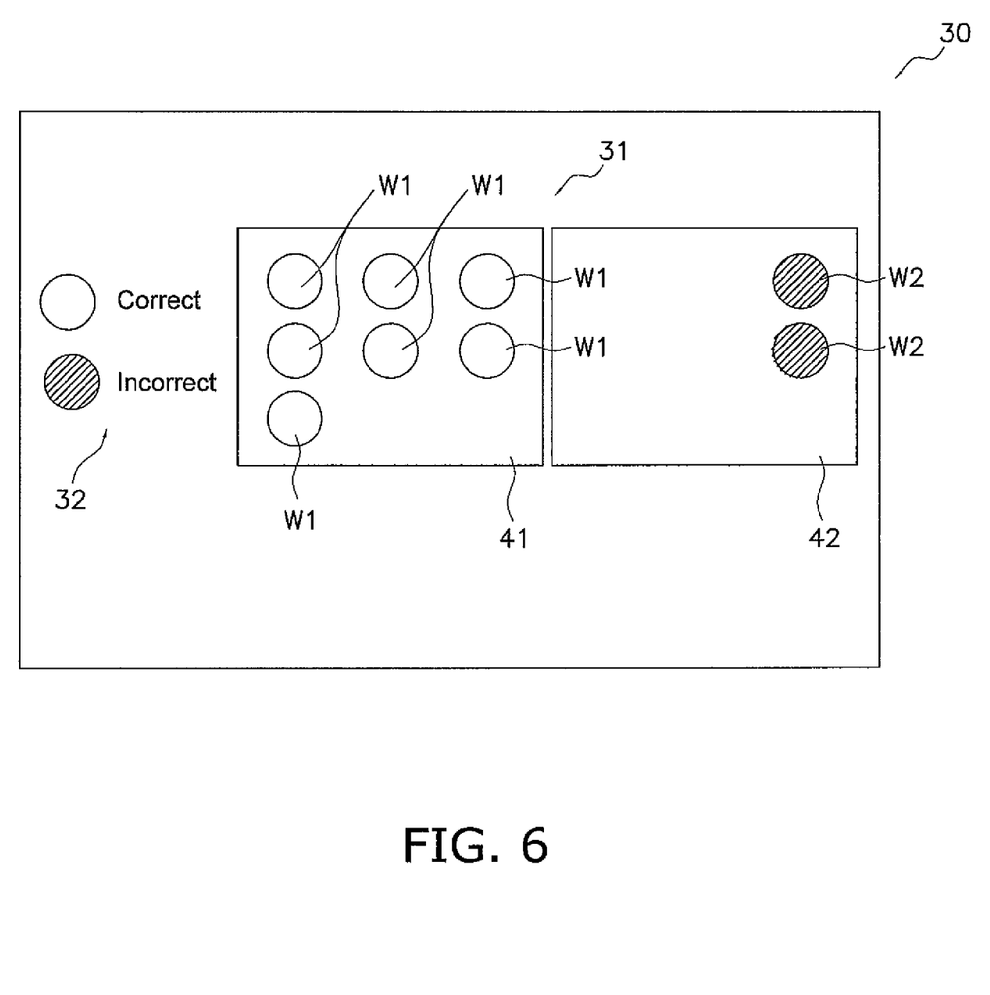
FIG. 6 illustrates content displayed on the terminal screen shown in FIG. 5.
Figure 7:
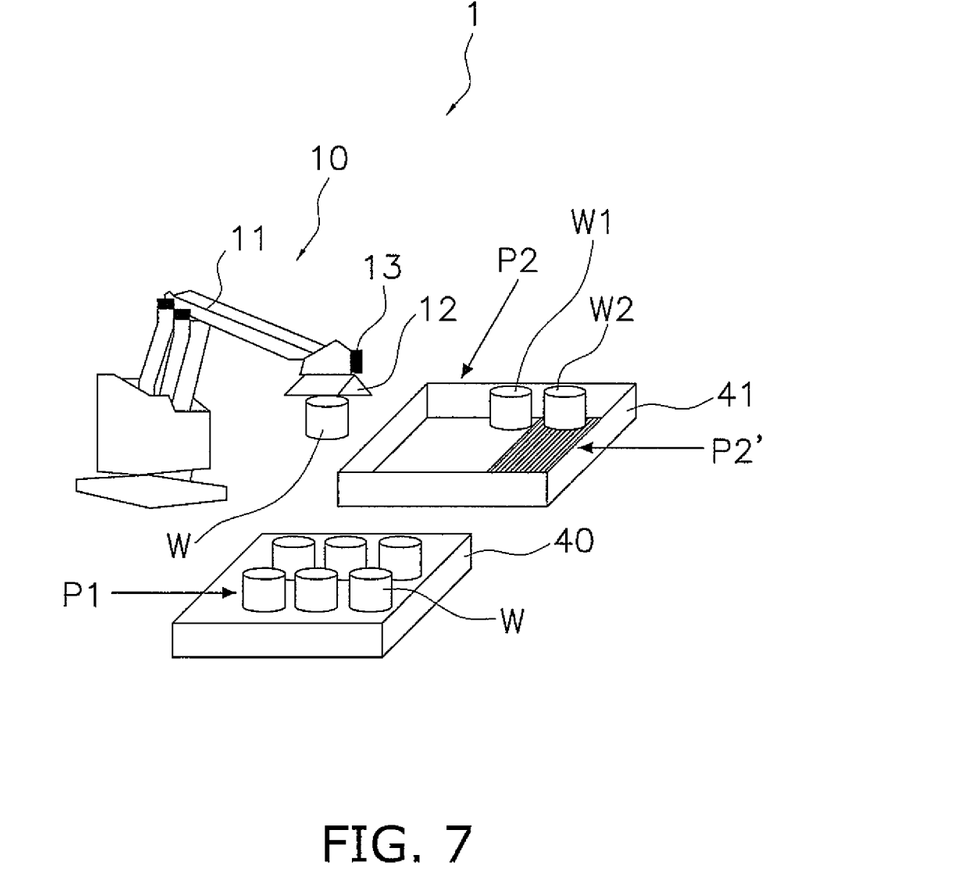
FIG. 7 illustrates a configuration of a picking system according to yet another preferred embodiment of the present invention.

The third predetermined position P3 can be located, for example, in an error work box 42 provided separately from the workpiece placing box 41 as shown in FIG. 5. As a result, the picking system 1 will never place a workpiece W in the workpiece placing box 41 if the identification information of that work piece W does not match the identification information in the control command. Similar to FIG. 2, the position indicating unit 30 in this preferred embodiment shows a plan view of all the workpieces W placed in the workpiece placing box 41 and in the error work box 42 and indicates the workpieces W in accordance with a legend such that workpieces W1 whose identification information matches the identification information in the control command can be distinguished from workpieces W2 whose identification information does not match the identification information in the control command (see FIG. 6).

When the comparing unit 22 determines that the identification information does not match in step S4, it is also acceptable if the picking robot 10 does not place the workpiece W in a specified position within the second predetermined position P2 in accordance with the control command but, instead, places the workpiece W in a different position P2' within the second predetermined position P2 where the workpiece W can easily be removed by a user. In this case, too, the placement position of a workpiece W that is different from a workpiece W originally scheduled for placement can be readily ascertained, similar to the picking system 1 according to the previously explained preferred embodiments. The position P2' is established at a position on a side closer to a user (worker), a position along a perimeter of the workpiece placing box 41, or at a position where the user can easily remove the workpiece W2.

The previously explained preferred embodiments present an example in which the picking system 1 is preferably arranged to use the identification information acquired by the ID reader 13 as a key to acquire attribute information from a database DB stored in the memory unit 25. However, the present invention is not limited to such a method. For example, it is acceptable if the attribute information of each workpiece, i.e., attribute data like that described previously, is stored directly on the IC tag. With this storage method, the same effects can be obtained as with the picking system 1 according to the previously explained preferred embodiments.

The previously explained preferred embodiments present an example in which the picking system 1 is preferably arranged to use an RFID tag to provide identification information and an ID reader to acquire the identification information from the RFID tag. However, the present invention is not limited to such a method. For example, it is acceptable to use a barcode or a two dimensional barcode to provide identification information and a barcode reader to acquire the identification information. It is also acceptable to prepare a seal or the like having unique identification information inscribed directly thereon, attach the seal to the workpiece, and use a camera or the like to acquire the identification information. With these methods, the same effects can be obtained as with the picking system 1 according to the previously explained preferred embodiments.

The previously explained preferred embodiments present an example in which the picking system 1 is arranged to use an encoder 15 to make an actual measurement in order to identify the position of the hand 12 of the picking robot 10. However, the present invention is not limited to such a method. For example, it is acceptable to identify the position of the hand 12 using content of the control command used to control the picking robot, i.e. using information regarding the second predetermined position P2 included in the control command.

The previously explained preferred embodiments present an example in which the picking system 1 is preferably arranged such that, as shown in FIG. 2, the attribute information indicating unit 33 indicates items that are actually incorrect within the attribute information of a workpiece W2 whose identification information does not match that in the control command. However, the present invention is not limited to such a method. For example, it is acceptable if attribute information of a workpiece originally scheduled to be placed and attribute information of a workpiece incorrectly placed are presented side by side.

The previously explained preferred embodiments present an example in which the picking system 1 is preferably arranged such that identification information of a workpiece W targeted for picking is included in a control command. However, the present invention is not limited to such a method. For example, it is acceptable if the comparing unit executes a comparison process based on a shipping list, recorded on which are the positions and identification information of workpieces scheduled to be shipped when the workpiece placing box has been loaded full of workpieces.

The present invention makes it possible for a user to recognize immediately when a workpiece that has been placed is different from a workpiece originally scheduled to be placed. Therefore, the present invention can be applied to a wide range of systems that include a separating process or a picking process, e.g. an automated warehouse or a conveyance system.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A picking system arranged to pick an article on which identification information is attached, the picking system comprising:
  a picking unit arranged to pick an article from a first predetermined position and place the article in a predetermined position other than the first predetermined position;
  an ID reader arranged to acquire identification information of an article picked by the picking unit;
  a position identifying unit arranged to identify a placement position of an article placed by the picking unit;
  a comparing unit arranged to compare the identification information acquired by the ID reader with identification information of an article scheduled to be picked; and
  a display unit arranged to, based on a result of the comparison executed by the comparing unit and the placement position identified by the position identifying unit, display a placement position of a placed article whose identification information does not match the identification information of the article scheduled to be picked, wherein
  regardless of whether or not the identification information of the picked article matches the identification information of the article scheduled to be picked, the picking unit picks the article from the first predetermined position and places the picked article in the predetermined position other than the first predetermined position, and
  the picking unit is arranged such that, if the result of the comparison executed by the comparing unit indicates that identification information of an article that has been picked does match the identification information of the article scheduled to be picked, the article that has been picked is placed in a second predetermined position, and if the result of the comparison executed by the comparing unit indicates that identification information of an article that has been picked does not match the identification information of the article scheduled to be picked, the article that has been picked is placed in a third predetermined position, the second predetermined position being located separately from the third predetermined position.

2. A picking system arranged to pick an article on which identification information is attached, the picking system comprising:
   a picking unit arranged to pick an article from a first predetermined position and place the article in a predetermined position other than the first predetermined position;
   an ID reader arranged to acquire identification information of an article picked by the picking unit;
   a position identifying unit arranged to identify a placement position of an article placed by the picking unit;
   a comparing unit arranged to compare the identification information acquired by he ID reader with identification information of an article scheduled to be picked; and
   a display unit arranged to, based on a result of the comparison executed by the comparing unit and the placement position identified by the position identifying unit, display a placement position of a placed article whose identification information does not match the identification information of the article scheduled to be picked, wherein
   regardless of whether or not the identification information of the picked article matches the identification information of the article scheduled to be picked, the picking unit picks the article from the first predetermined position and places the article in a second predetermined position,
   the position identifying unit identifies the placement position of the article placed in the second predetermined position,
   the display unit displays the placement position of the placed article in the second predetermined position whose identification information does not match the identification information of the article scheduled to be picked, and
   based on the result of the comparison executed by the comparing unit, the picking unit places an article whose identification information does not match the identification information of the article scheduled to be picked in a first location near an edge of the second predetermined position where a user can remove the placed article easily, and the picking unit places an article whose identification information does match the identification information of the article scheduled to be picked in a second location of the second predetermined position, the first location being different from the second location.

3. The picking system according to claim 1, wherein the display unit is arranged to indicate a plurality of information items related to an article whose identification information does not match the identification information of the article scheduled to be picked.

4. The picking system according to claim 2, wherein the display unit is arranged to indicate a plurality of information items related to an article whose identification information does not match the identification information of the article scheduled to be picked.

5. A picking method for picking an article on which identification information is attached, the picking method comprising:
   picking an article from a first predetermined position and placing the article in a predetermined position other than the first predetermined position;
   reading identification information of the article picked in the picking step;
   identifying a placement position of the article placed in the picking step;
   comparing the identification information acquired in the ID reading step with identification information of an article scheduled to be picked; and
   displaying, based on a result of the comparing step and the placement position identified in the placement position identifying step, a placement position for the placed article whose identification information does not match the identification information of the article scheduled to be picked; wherein
   in the picking step, regardless of whether or not the identification information of the picked article matches the identification information of the article scheduled to be picked, the article is picked from the first predetermined position and: if the result of the comparison executed by the comparing unit indicates that identification information of an article that has been picked does match the identification information of the article scheduled to be picked, the article that has been picked is placed in a second predetermined position, and if the result of the comparison executed by the comparing unit indicates that identification information of an article that has been picked does not match the identification information of the article scheduled to be picked, the article that has been picked is placed in a third predetermined position, the second predetermined position being located separately from the third predetermined position; and
   the picking method is performed using physical hardware.

6. The picking system of claim 1, wherein the display unit includes a terminal screen.

7. The picking method of claim 5, wherein the displaying is performed using a terminal screen.

* * * * *